US009351323B2

(12) United States Patent
Huang et al.

(10) Patent No.: US 9,351,323 B2
(45) Date of Patent: May 24, 2016

(54) METHOD OF REGISTERING ELECTRIC DEVICES IN WIRELESS CONTROL SYSTEM

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Yunlin (TW)

(73) Assignee: GRAND MATE CO., LTD., Taichung (TW)

( * ) Notice: Subject to any disclaimer, the term of this patent is extended or adjusted under 35 U.S.C. 154(b) by 126 days.

(21) Appl. No.: 14/260,086

(22) Filed: Apr. 23, 2014

(65) Prior Publication Data

US 2015/0312948 A1  Oct. 29, 2015

(51) Int. Cl.
*H04W 76/02* (2009.01)
*H04W 84/12* (2009.01)
*H04L 29/08* (2006.01)
*H04L 12/40* (2006.01)

(52) U.S. Cl.
CPC .......... *H04W 76/021* (2013.01); *H04L 67/125* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2013/0049970 A1* | 2/2013 | Finch | H02J 3/14 340/635 |
| 2014/0126581 A1* | 5/2014 | Wang | H04W 4/001 370/431 |
| 2015/0055557 A1* | 2/2015 | Dong | H04W 4/005 370/328 |

OTHER PUBLICATIONS

P. Waher, XEP-0324: Internet of Thing—Provisioning, version 0.0.2, Mar. 31, 2014, pp. 1-28.*

* cited by examiner

*Primary Examiner* — Christopher Crutchfield
(74) *Attorney, Agent, or Firm* — Ming Chow; Sinorica, LLC

(57) ABSTRACT

A method of registering an electric device in a wireless control system includes: A. Input a device code of an electric device and a user code, and save them in an interpreter; B. Transmit the device code and the user code to a server; and C. Establish a connection between the device code and the user code in the server. With the connection between the device code and the user code the wireless control system may identify each registered electric device and the user who owns the electric device.

9 Claims, 2 Drawing Sheets

METHOD OF REGISTERING ELECTRIC DEVICES IN WIRELESS CONTROL SYSTEM

BACKGROUND OF THE INVENTION

1. Technical Field

The present invention relates generally to a system for controlling electric devices, and more particular to a method of establishing a connection in a wireless control system.

2. Description of Related Art

Remote control is more and more popular in present days to control electric appliances without having to walk to the devices. Typically, one remote control is matched with one electric appliance in a one-to-one relation, which means that each electric appliance has a specified remote control to control it. There may be electric devices of the same model in different rooms. For this situation, the user may control these electric devices with one remote control. However, we still provide a plurality of remote controls in each room for convenience.

A conventional remote control system is provided with an interpreter, which allows user to access the system through a remote control device, such as computer, and mobile phone. With such remote control system, user inputs a command on the remote control device, and this command is transmitted to the interpreter. The interpreter converts the command into a control signal, and transmits the control signal to the specified electric appliance through a network. As a result, user may control various electric appliances with one remote control device.

Some product providers provide a service to whom brought their products with the remote control system. With an approval of the customer, the product provider establishes a connection between the product in the customer's place and the service station through above system to monitor the product. However, there are various products sold to different customers, so it is difficult for the remote control system to identify each product and the owner of the product.

BRIEF SUMMARY OF THE INVENTION

In view of the above, the primary objective of the present invention is to provide a method of registering an electric device in a wireless remote control system, which may establish a connection between the electric device and the user of the electric device in a server.

The present invention provides a method of registering an electric device in a wireless control system; wherein the wireless control system includes a server, an access point, an interpreter, and an electric device; the server is connected to the access point through a network; the interpreter is connected to the access point through Wi-Fi signals; the electric device is connected to the interpreter; the method comprising the steps of:

A. Obtain a device code of the electric device, and save the device code in the interpreter, wherein the device code represents the electric device;

B. Transmit the device code and a user code from the interpreter to the server through the access point, wherein the user code represents an owner of the electric device; and C. Establish a connection between the device code and the user code in the server.

With such design, it may establish a connection between the electric device and the user of the electric device in the server of the wireless control system.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
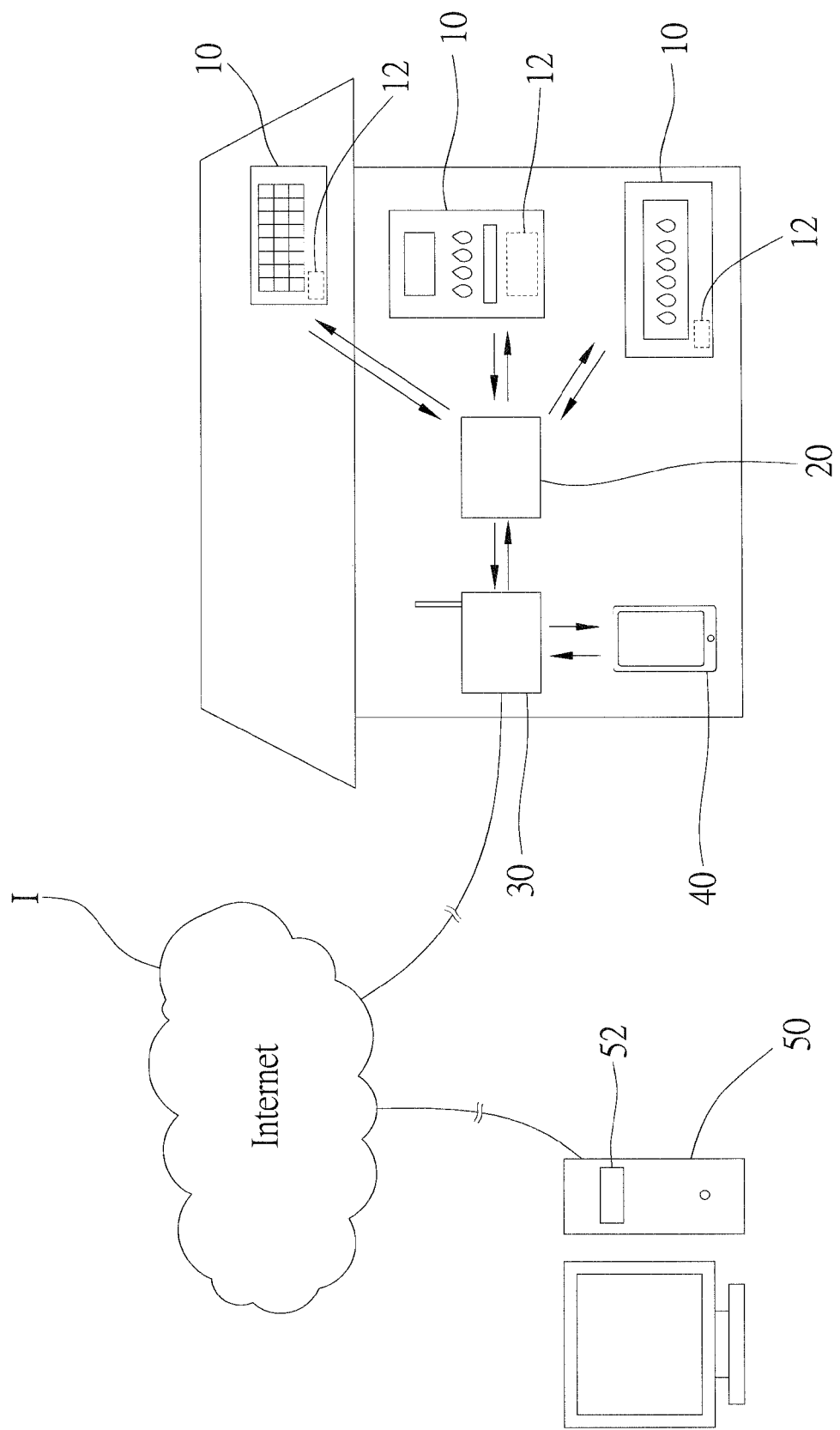
FIG. 1 is a sketch diagram of the remote control system of a preferred embodiment of the present invention.

FIG. 1 shows a wireless control system of the preferred embodiment of the present invention, which includes a plurality of electric devices 10, an interpreter 20, an access point 30, a remote control device 40, and a server 50.

Figure 2:
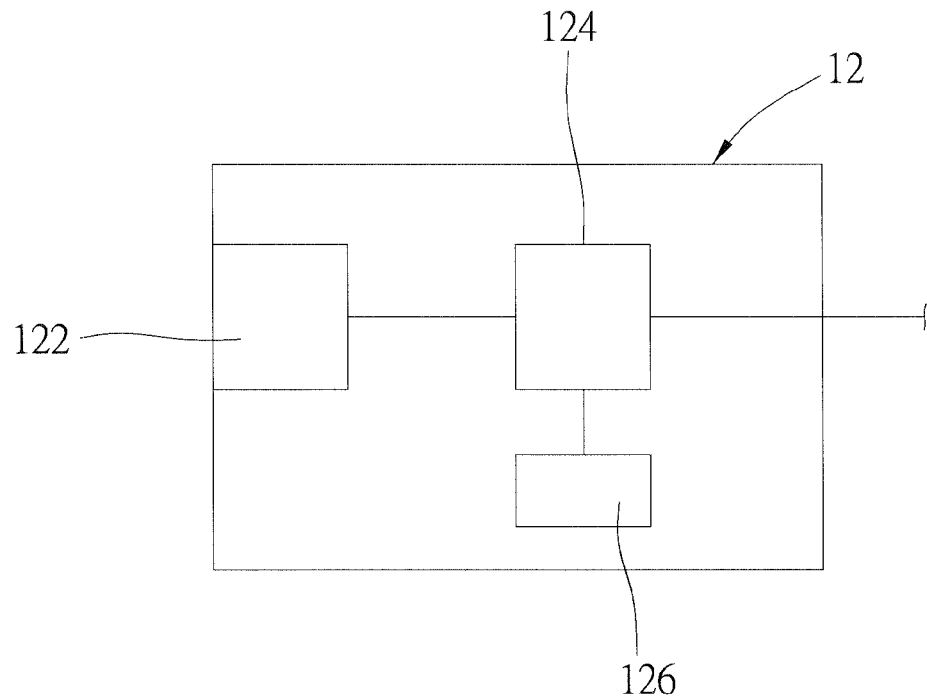
FIG. 2 is a block diagram of the control unit of the preferred embodiment of the present invention and FIG. 3 is a block diagram of the interpreter of the preferred embodiment of the present invention.

The electric devices 10 are home appliances in an ordinary house, such as air condition, fireplace, and water heater. Each electric device 10 includes a control unit 12. As shown in FIG. 2, the control unit 12 has a RF transceiver 122, a control circuit 124, and a memory 126. The RF transceiver 122 transmits and receives radio frequency (RF) signals. The control unit 12 is electrically connected to the RF transceiver 122 to receive RF signals from the RF transceiver 122. The control unit 12 retrieves commands in the RF signals to control the electric devices 10 accordingly, such as turning the electric device 10 on/off and adjusting temperature. The control unit 12 also transmits RF signals to the RF transceiver 122. The control unit 12 receives a running status of the electric device 10, and converts it into a RF signal, and then the RF signal is transmitted to the interpreter 20 through the RF transceiver 122. The running status includes power on/off, current temperature, and error code. Each electric device 10 has a device code to represent the electric device 10, and the device codes are saved in the memory 126. In an embodiment, the device code contains model and series number of the electric device 10. The model and the series number are provided by the manufacturer of the electric device 10, two electric devices 10 may have the same models, but the series numbers are different for sure. The device code is combined with the running status and converted into the RF signal for identification.

Figure 3:
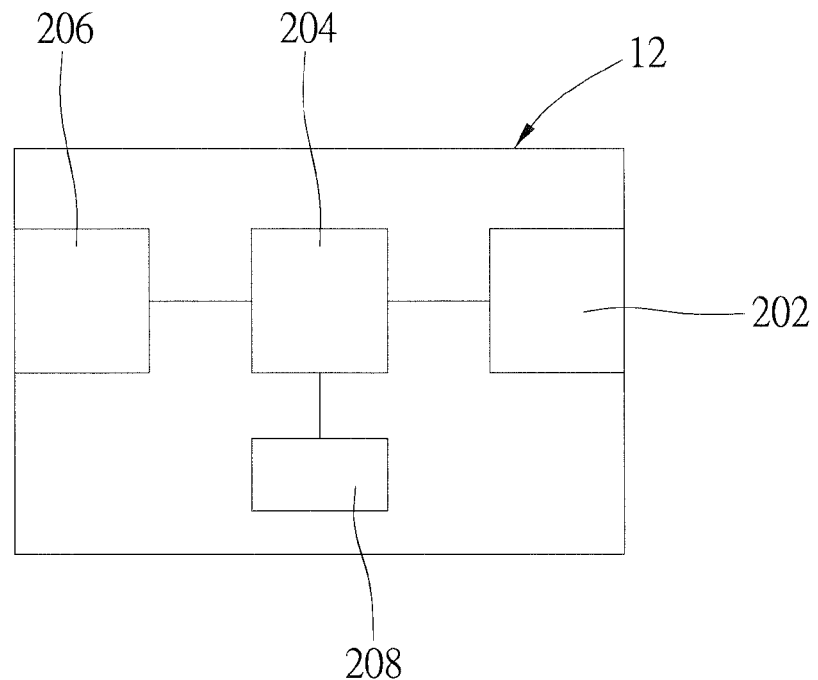

As shown in FIG. 3, the interpreter 20 has a RF transceiver 202, a converter 204, a Wi-Fi transceiver 206, and a memory 208. The RF transceiver 202 receives the RF signals from the control units 12 of the electric devices 10 or transmits RF signals to the control units 12. The converter 204 receives the RF signal from the RF transceiver 202, and converts the RF signal into a corresponding Wi-Fi signal, and then the Wi-Fi signal is sent to the remote control device 40 through the Wi-Fi transceiver 206. On the contrary, when the Wi-Fi transceiver 206 receives a Wi-Fi signal, it is transmitted to the converter 204 to be converted into a corresponding RF signal, and then the RF signal is transmitted to the control units 12 of the specified electric device 10 through the RF transceiver 202.

The Wi-Fi transceiver 206 has a MAC address, and the converter 204 retrieves the MAC address and saves it in the memory 208. The MAC address is taken as an interpreter code to represent the interpreter 20. In an embodiment, each interpreter 20 is given a series number by the manufacturer, and the series number is saved in the memory 208 to be the interpreter code of the interpreter 20. Any signal from the electric devices 10 and the remote control device 40 can be saved in the memory 208.

The access point 30 is connected to the server 50 through a network, which is Internet I, and connected to the remote control device 40 and the interpreter 20 through Wi-Fi. In an embodiment, the remote control device 40 is a tablet, and the tablet is installed with an application for user to operate. While the tablet 40 is connected to the interpreter 20, the interpreter 20 transmits the interpreter code of the interpreter 20 and the device codes of the electric devices 10 to the tablet 40 to be saved in a memory of the tablet 40. Therefore, user may operate the tablet 40 to control any electric devices 10. First, the user has to select the electric device 10 to be controlled, and input a control command on the tablet 40. The tablet 40 converts the control command into a Wi-Fi signal, and transmits the Wi-Fi signal to the access point 30, and then the access point 30 transfers the Wi-Fi signal to the interpreter 20. The same as above, the interpreter 20 converts the Wi-Fi signal into a corresponding RF signal by the converter 204, and then transmits the RF signal to the specified electric device 10 through the RF transceiver 202 to control the electric device 10. On the contrary, the running status of each electric device 10 is transmitted to the tablet 40 in the reverse way to show the statuses of the electric devices 10 on a screen of the tablet 40. In an embodiment, the remote control device may be smartphone, computer, PDA, or any device which may transmit and receive Wi-Fi signals.

The server 50 has a database 52 to save the running statuses of the electric devices 10 for monitoring the electric devices 10. The present invention provides a method to register the interpreter 20 and the electric devices 10, which are connected to the interpreter 20, in the wireless control system. The method includes the following steps:

Once the electric devices 10 are connected to the interpreter 20, the control unit 12 of each electric device 10 transmits the device code, which is saved in the memory 126, to the interpreter 20 through the RF transceiver 122. The interpreter 20 saves the devices codes of the electric devices 10 in the memory 208.

The user operates the tablet 40 to select a connection command, and then the application will ask the user to input a user code. In an embodiment, the user code includes an account and a password. The tablet 40 transmits the connection command and the user code to the interpreter 20 in the way as described above. The interpreter 20 retrieves the connection command and the user code from the Wi-F-signal, and saves the user code in the memory 208. Next, the converter 204 of the interpreter 20 generates a start command, and transmits the start command to the access point 30 through the Wi-Fi transceiver 206, and then the access point 30 transfers the start command to the server 50. After receiving the start command, the server 50 generates a confirmation command, and sends it back to the interpreter 20. With the confirmation command, the converter 204 of the interpreter 20 starts to upload. The converter 204 transmits the user code, the interpreter code of the interpreter 20, and the device codes of the electric devices 10, which are saved in the memory 208, to the server 50 through the Wi-Fi transceiver 206 and the access point 30.

Above codes will be saved in the database 52 of the server 50, and then a connection between the user code and the interpreter code of the interpreter 20, and a connection between the device codes of the electric devices 10 and the interpreter code will be established.

After the connections are established, the running statuses of the electric devices 10 are transmitted to the server 50, and saved in the database 52. With the connection between the user code and the identification of the interpreter 20, it may acquire which electric device(s) 10 is/are connected to the interpreter 20 and a condition of the connection between each electric device 10 and the interpreter 20. The electric devices 10 may be sorted if there are a large number of electric devices 10. In an embodiment, there are more than one interpreters connected to the electric devices 10 respectively, and each interpreter has the same function as above. In practice, the interpreter code of the interpreter 20 is not transmitted to the server 50, and the connection between the user code and the identifying codes of the electric devices 10 is established directly.

With the method as described above, it may establish a connection between the user and the electric devices 10 belonging to him/her. Therefore, even there are a large number of users, it still may establish the connections between the users and the electric devices 10 belonging to each of them. For the services of the electric devices 10, they may obtain the running statuses of the electric devices 10, and warn the users to provide their customers a better service.

While the tablet 40 is unable to connect to the access point 30, the user still may connect to the server 50 through Internet I to obtain the current running statuses of the electric devices 10 and the running statuses saved in the server 50. At the same time, the user may send a control command to the server 50, and the server 50 transfers the control command to the interpreter 20 through Internet I and the access point 30 to control the specific electric device(s).

In an embodiment, once the access point 30 is connected to the server 50, the interpreter 20 may send the start command to the server 50, and wait for the confirmation command. The interpreter 20 transmits the interpreter code and the device codes to the server 50, and saves them in the memory 52 of the server 50 after the confirmation command is received. The user also may send the acquiring command from the tablet 40 to the interpreter 20 to control the converter 204 to send the interpreter code back to the tablet 40, so that with the interpreter code the user may input the user code on the tablet 40 to transmit the user code and the interpreter code to the server 50 through the access point 30.

In an embodiment, the user may manually input the interpreter code of the interpreter 20 on the tablet 40, and the interpreter code and the user code will be transmitted to the server 50 through Internet I, and saved in the memory 52 to register the interpreter 20 and the electric device(s) 10 which is/are connected to the interpreter 20.

It must be pointed out that the embodiments described above are only some preferred embodiments of the present invention. All equivalent structures which employ the concepts disclosed in this specification and the appended claims should fall within the scope of the present invention.

What is claimed is:

1. A method of registering an electric device in a wireless control system; wherein the wireless control system includes a server, an access point, an interpreter, and an electric device; the server is connected to the access point through a network; the interpreter is connected to the access point through Wi-Fi signals; the electric device is connected to the interpreter; the method comprising the steps of:
   A. obtaining a device code of the electric device, and saving the device code in the interpreter, wherein the device code represents the electric device;
   B. transmitting the device code and a user code from the interpreter to the server through the access point, wherein the user code represents an owner of the electric device; and C. establishing a connection between the device code and the user code in the server.

2. The method of claim 1, wherein the device code is transmitted to the interpreter from the electric device.

3. The method of claim 1, further comprising:
transmitting an interpreter code of the interpreter from the interpreter to the server, wherein the interpreter code represents the interpreter; and
establishing a connection between the device code and the interpreter code in the server.

4. The method of claim 3, further comprising:
transmitting a start command from the interpreter to the server;
transmitting a confirmation command from the server to the interpreter when the server receives the start command;
transmitting the user code, the device code, and the interpreter code from the interpreter to the server.

5. The method of claim 4, further comprising:
operating a remote control device to transmit a connection command to the interpreter; and
transmitting start command to the server when the interpreter receives the connection command.

6. The method of claim 5, wherein the user code is transmitted to the interpreter from the remote control device.

7. The method of claim 3, further comprising:
transmitting the interpreter code from the interpreter to a remote control device through the access point;
operating the remote control device to transmit the interpreter code and the user code from the remote control device to the server.

8. The method of claim 3, further comprising:
inputting the interpreter code of the interpreter on a remote control device; and
operating the remote control device to transmit the interpreter code and the user code from the remote control device to the server.

9. The method of claim 3, wherein the interpreter has a Wi-Fi transceiver to transmit and receive Wi-Fi signals, and the Wi-Fi transceiver has a MAC address, which is taken as the interpreter code of the interpreter.

* * * * *